United States Patent [19]
Gancy et al.

[11] 3,981,965
[45] Sept. 21, 1976

[54] SUPPRESSION OF WATER POLLUTION CAUSED BY SOLID WASTES CONTAINING CHROMIUM COMPOUNDS

[75] Inventors: Alan B. Gancy, Syracuse; Christian A. Wamser, Camillus, both of N.Y.

[73] Assignee: Allied Chemical Corporation, Morris Township, N.J.

[22] Filed: June 17, 1975

[21] Appl. No.: 587,780

Related U.S. Application Data

[63] Continuation of Ser. No. 281,588, Aug. 17, 1972, abandoned.

[52] U.S. Cl. ........................ 423/55; 423/1; 423/571; 423/607
[51] Int. Cl.$^2$ ............... C01G 37/02; C01G 37/00; C01B 17/02
[58] Field of Search ............ 423/659, 606, 607, 55, 423/1, 571

[56] References Cited
UNITED STATES PATENTS

| | | | |
|---|---|---|---|
| 2,246,396 | 6/1941 | Tarr et al. | 423/607 X |
| 2,431,075 | 11/1947 | Parsons | 423/607 X |
| 2,560,338 | 7/1951 | Frayne | 423/607 |
| 2,695,215 | 11/1954 | Pollock | 423/607 |
| 3,937,785 | 2/1976 | Gancy et al. | 423/1 |

*Primary Examiner*—Edward Stern
*Attorney, Agent, or Firm*—Anthony J. Stewart; Jack B. Murray, Jr.

[57] ABSTRACT

A method of treating solid waste material containing minor amounts of water soluble chromium compounds with a reductant, particularly sulfide ions, to convert the soluble chromium to an insoluble state, and produce a solid waste from which substantially no chromium can be leached by water, as by exposure to rain.

14 Claims, 6 Drawing Figures

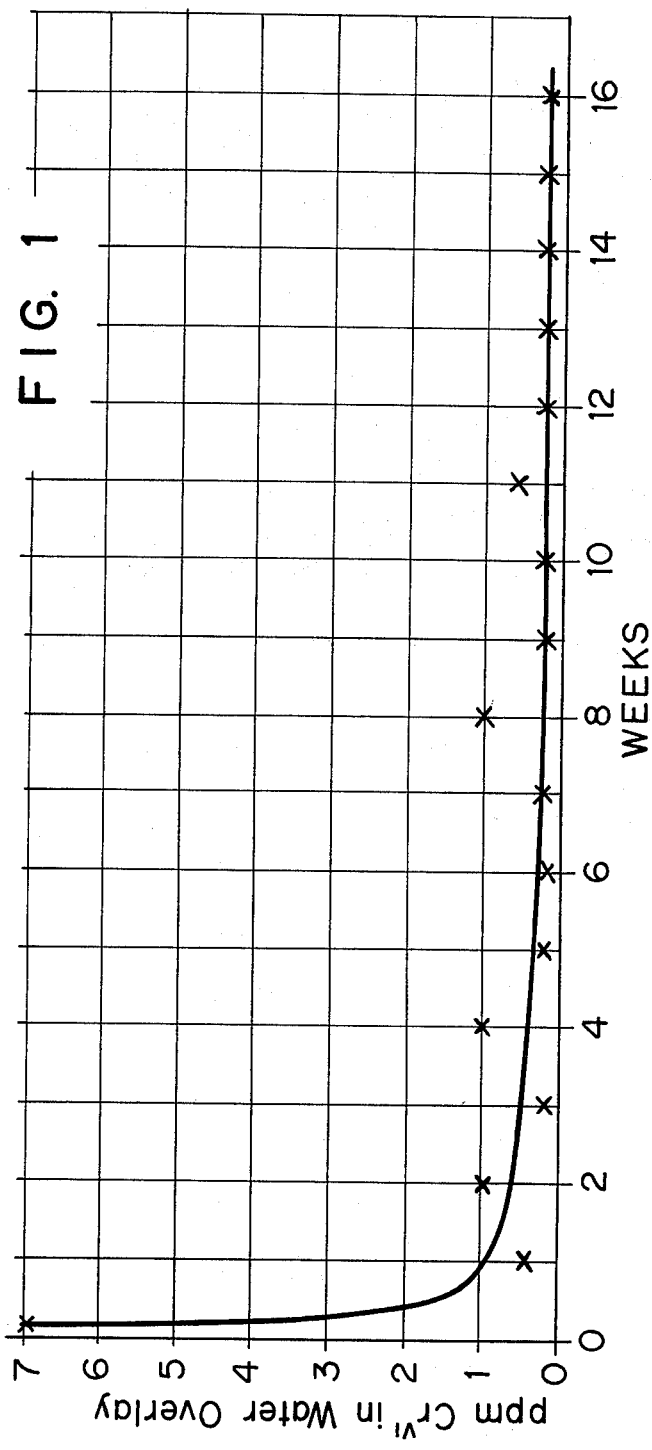
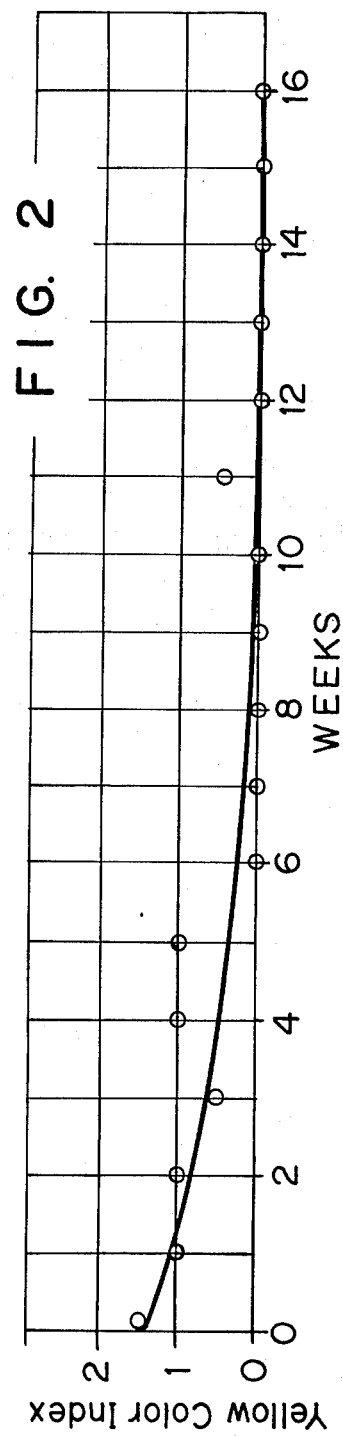

SUPPRESSION OF WATER POLLUTION CAUSED BY SOLID WASTES CONTAINING CHROMIUM COMPOUNDS

This is a continuation of application Ser. No. 281,588 filed Aug. 17, 1972, now abandoned.

BACKGROUND OF THE INVENTION

Solid industrial wastes containing minor amounts of water soluble chromium, such as those residues which result from the processing of chromium ores, will bleed chromium salts when wetted by exposure to rain. Such bleeding is objectionable, as soluble chromium compounds are toxic, and constitute a serious pollutant. Some of these water soluble chromium compounds have a relatively low degree of solubility and dissolve very slowly, hence cannot be readily leached to exhaustion. They nevertheless have sufficient solubility to pollute the environment by such bleeding long after they have been discarded. The present invention relates to a method of treating such solid wastes so that no appreciable quantity of chromium will bleed therefrom.

Solid industrial wastes containing minor amounts of water soluble chromium, such as those mineral wastes resulting from the manufacture of chromic acid and chromates, present a serious disposal problem long recognized by the industry. These wastes are generally discarded by stockpiling outdoors. If they consisted only of inert insoluble residues, they would pose no problem or threat to the ecology, but unfortunately, no matter how efficient the leaching process, some soluble toxic chromium salts remain. When such stockpiles are exposed to the elements and wetted by rain, these salts are gradually leached from the residue over long periods of time to pollute the ground water. It is clear that to stockpile these wastes where they would not be wetted, would be difficult and expensive, therefore some means of minimizing or eliminating the tendency of these wastes to pollute their environment with toxic chromium compounds is badly needed.

The fact that these residues continue to bleed soluble chromium salts on wetting, even though previously subjected to efficient leaching methods, is understandable when it is considered that the residue obtained in the processing of chromium ore generally contains small amounts of calcium chromate, $CaCrO_4$, and calcium alumino-chromate, $3CaO_x.Al_2O_3.CaCrO_4.12H_2O$, which are very slowly soluble in water; tribasic calcium chromate, $Ca_3(CrO_4)_2$, which decomposes slowly in the presence of water to produce hexavalent chromium and insoluble trivalent chromium hydroxide; and basic ferric chromate, $Fe(OH)CrO_4$ which hydrolyzes slowly in water, releasing chromate ions. The waste residue also contains some trivalent chromium compounds, but these are insoluble in water and do not contribute to the pollution problem.

In the manufacture of the chromium compounds it has generally been the practice to mix ground chrome ore with lime and soda ash, then calcine it at high temperature in an oxidizing atmosphere whereby a large proportion of the chromium in the ore is converted to sodium chromate. This is extracted from the calcine by leaching with water. The spent ore consists mainly of a complex mixture of cement-like calcium compounds such as silicates, aluminates, and alumino-ferrites derived from the action of the lime on the gangue and other non-chromium constituents of the chrome ore during the calcining operation.

As previously mentioned, despite highly efficient leaching methods, the waste residue generally contains minor amounts of unleached, water soluble chromium compounds, and these dissolve in water at widely different rates. These residual, slowly soluble chromium compounds generally are present to the extent of from 0.7 to 2.0 percent Cr on a weight basis, but can vary widely from about 0.5 to 5 percent or more. Such residue when wetted will generally bleed chromium salts to an extent such that the bleed will contain about 100 to 500 or more parts per million (ppm) as Cr. This amount is much above that normally considered acceptable. Generally, it is desirable to have the Cr content of the bleed amount to less than 25 ppm and if possible, less than 10 ppm. Of course, the ideal situation would be to have a zero chromium content or substantially zero (i.e. a fraction of 1.0 ppm).

SUMMARY OF THE INVENTION

A method of treating solid waste material containing minor amounts of water soluble chromium compounds with a reductant, which comprises adding a reductant and water in the form of a solution or dispersion to the solid waste to convert the soluble chromate to a more water insoluble form, thereby producing a solid waste from which substantially no chromium can be leached by water, as by exposure to rain. The aqueous medium may be separated from the solid wastes so treated and at least part of the separated aqueous medium may be used in a succeeding reduction.

The reductant can be an inorganic sulfur-containing compound selected from the group consisting of alkali metal and alkaline earth metal sulfides, hydrosulfides, dithionates and a mixture of any of these. Of particular utility as reducing agents are the sulfides, especially calcium sulfide and sodium hydrosulfide. These sulfides can effect reduction and conversion of soluble chromates to insoluble chromates in the alkaline medium characteristic of these waste residues, thereby obviating the need for large quantities of acid to achieve an acidic medium.

Also very effective as reducing agents to achieve the desired conversion are to alkali metal and alkaline earth metal dithionites, such as sodium dithionite ($Na_2S_2O_4$). These also offer the advantage of performing under alkaline conditions characteristic of the chromium ore waste residues, a drawback being their cost which is considerably higher than that of the preferred sulfides.

Still another group of compounds that perform quite satisfactorily in an alkaline medium to reduce soluble chromium compounds to the insoluble form, are those organic compounds which have labile sulfide atoms and therefore behave as slow-release sulfide reagents. Among this group of organic compounds are thiourea, thioglycolic acid, sodium xanthate, thioacetamide, and bis(dimethylthiocarbamoyl)disulfide, better known an "Thiram". Here again, the aforementioned metal sulfides are preferred because of cost considerations.

Of the two preferred sulfides, namely sodium hydrosulfide and calcium sulfide, each appears to behave in a unique manner. The sodium hydrosulfide is quite soluble and could be expected to form polysulfides as does the more alkaline sodium sulfide. Actually, the yellow color of the polysulfide is generally in evidence when sodium hydrosulfide is first used as a reductant, but this color is transient, and soon disappears. The objection to the yellow color of the polysulfides stems from its resemblance to the toxic yellow chromate bleed. Although almost indistinguishable in appearance, the polysulfide is substantially non-toxic in comparison with the soluble chromium bleed which it resembles.

The effectiveness of the sodium hydrosulfide is apparently due, surprisingly, to its interaction with the waste matrix wherein it deposits a sulfide compound with uniquely appropriate sulfide-releasing properties.

In the case of calcium sulfide, no polysulfide formation is observed. It was hypothesized and later confirmed that CaS, having a limited solubility in water, cannot provide sufficient sulfide ion concentration to dissolve elemental sulfur to form the polysulfide. As a result, sulfide ions released from CaS are apparently consumed entirely in reducing the chromate from the hexavalent to the insoluble trivalent state.

Calcium sulfide is thus a preferred reagent for chromate reduction which releases sulfide ions at a desirable rate, presumably controlled by the equilibrium:

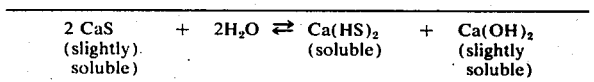

$$2\,CaS\,(\text{slightly soluble}) + 2H_2O \rightleftarrows Ca(HS)_2\,(\text{soluble}) + Ca(OH)_2\,(\text{slightly soluble})$$

When powdered calcium sulfide is mixed into chrome waste residue, with the aid of a minimum quantity of water to facilitate mixing, it is found that initially the rate of chromate diffusion from the residue can exceed the rate at which soluble sulfide (actually hydrosulfide, $HS^-$) is released by the hydrolytic reaction shown above. However, in time, as the more rapidly solubilizing of the various chromate species becomes depleted through chemical reduction, the net bulk diffusion of chromate and sulfide are balanced to such an extent that substantially no chromate bleeds externally from the waste system on exposure to water. This is manifested by a rise, then decline, of the chromate concentration in the water phase associated with the waste residue.

After this initial phase, protection against chromate bleeding is found to be maintained for considerable periods if the amount of CaS added is at least about one-third and preferably equal to that stoichiometrically equivalent to the total chromate in the waste on a simple 3 moles of sulfide per 2 moles of chromate basis.

In tests made, using CaS on typical chromate waste residues, the only detectable species in the water-white bleed obtained were traces of calcium hydroxide and thiosulfate. The use of calcium sulfide was found to be very effective. Similar tests using mixtures of sodium hydrosulfide and waste chromate residues were also effective. Chromate bleeding was rapidly and effectively suppressed, and surprisingly, polysulfide formation was negligible.

Analysis of the solid and liquid phases from a residue-NaHS mixture (details in Example No. 3) indicated that in a matter of days those soluble sulfide values which have not been consumed through interaction with chromate, transfer from the liquid to the solid waste phase to form some compound or compounds which appear to have slow release sulfide properties comparable to calcium sulfide itself. The compound(s) formed proved to be amorphous on characterization by X-ray diffraction analysis. The compounds may consist of CaS itself and/or a calcium aluminosulfide since in separate experiments a compound was prepared from a synthetic mixture of $3CaO.Al_2O_3.6H_2O$, $Ca(OH)_2$ (both present in chrome waste) and NaHS which exhibited a well-defined X-ray diffraction pattern consistent with a sulfide-substituted $Ca_3Al_2(OH)_{12}$ and a chemical analysis consistent with a compound of the type $3CaO.Al_2O_3.CaS.xH_2O$ (of which a variety of analogs are known).

DESCRIPTION OF THE PREFERRED EMBODIMENT

A description of a preferred method of treating residual solid chromate waste, employing CaS as the reductant, follows:

To the waste residue is added a quantity of powdered calcium sulfide corresponding stoichiometrically to the total residual chromate of the waste. This amounts to 3 moles of CaS for 2 moles of $CrO_4$, e.g. for 1 ton of waste containing 1% Cr, 41.5 pounds of CaS are required. Just enough water is added to make the material workable so that a reasonably uniform mixture may be obtained on light stirring.

The mix is allowed to stand for 2 or 3 days prior to dumping at the disposal site, during which period the more-rapidly soluble chromates released into the aqueous phase associated with the solid waste becomes reduced by sulfide ions released from the added CaS. From this point on, the waste tends to release chromate at a diminished rate as the less rapidly soluble of the residual chromates slowly solubilize. The calcium sulfide particles continue to release sulfide ions in conformity with the reaction:

$$2CaS + 2H_2O \rightleftarrows Ca(HS)_2 + Ca(OH)_2$$
$$\downarrow\uparrow$$
$$Ca^{++} + 2HS^-$$

The relative rates of diffusion of chromate and sulfide ions are such that the net bulk diffusion of chromate from the waste system into the external environmental water phase is completely suppressed for a long period.

The products of the reaction of chromate and sulfide are the highly insoluble solids $Cr(OH)_3$ and elemental sulfur which remain immobilized in the waste system:

$$2CrO_4^- + 3HS^- + 5H_2O \rightarrow 2Cr(OH)_3 + 3S^\circ + 7OH^-$$

The aqueous phase contains no soluble substances other than harmless $Ca(OH)_2$ and minute traces of thiosulfate, $S_2O_3^=$, both of which ultimately become converted by atmospheric carbon dioxide and oxygen into immobile $CaCO_3$ and harmless sulfate, $SO_4^=$, respectively.

In particular, the water effluent becomes water-white; and substantially no by-product polysulfide ion forms by interaction of elemental sulfur and the soluble sulfide ion. The sulfide-release properties of CaS render it uniquely suited to this application.

A description of a preferred method of treating residual solid chromate waste employing NaHS as the reductant, follows:

To the waste residue is added a quantity of NaHS (preferably in the form of its commonly available commercial form — a 40 – 45% aqueous solution) corresponding stoichiometrically to the total residual chromate of the waste. This amounts to 3 moles of NaHS for 2 moles of $CrO_4$, e.g. for 1 ton of waste containing 1% Cr, 32.3 pounds of NaHS (or 81 pounds of 40% solution) are required.

The NaHS solution may be pre-diluted with the minimum amount of water that will make the mix workable and facilitate obtaining a reasonably uniform mixture on light stirring. Drained chrome waste residue normally contains about 17% water which, together with the water contained in the NaHS solution, provides a workable mix. Partially air-dried residue may only contain 12 – 13% water and some additional water may be required in formulating the mix.

The mixture is allowed to store for 2 or 3 days prior to dumping at the disposal site, during which period a desirable sequence of reactions occurs:

a. the sulfide ion, now present in the aqueous phase at a relatively higher concentration than is the case when CaS is used, destroys the more rapidly solubilizing chromate species bleeding from the waste in a matter of ½ to 1 day at ambient temperature.

b. In the meantime, the residual soluble sulfide ions in the aqueous phase transfer into the solid phase through interaction with certain of the calcium compounds which are present in large amounts in the waste residue. Although the exact identity of the solid sulfide formed has not been established, it is believed to be a calcium alumino-sulfide which separate experiments indicated can be prepared by:

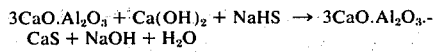
$$3CaO.Al_2O_3 + Ca(OH)_2 + NaHS \rightarrow 3CaO.Al_2O_3.CaS + NaOH + H_2O$$

c. The solid sulfide thus formed has sulfide-release properties very similar to that of CaS, as was confirmed in separate experiments in which the rate of soluble sulfide from CaS into a given amount of water was compared with that of a sample of washed sulfided residue containing an equivalent quantity of sulfide.

The waste-NaHS system thus approaches the waste-CaS system described previously and chromate bleeding into water becomes completely suppressed indefinitely. The principal differences in the systems are:

a. the active slow-release sulfide may be different;

b. some traces of polysulfide may form in the waste-NaHS system since (unlikde the CaS system), the sulfide concentration is relatively high in the early stages after preparation of the mix.

However, the concentrations of polysulfide observed have been quite low, and the polysulfide formation in the waste-NaHS system can be suppressed by adding a little sodium sulfite, $Na_2SO_3$, along with the NaHS in the original waste treatment operation. $Na_2SO_3$ is inactive toward monosulfides such as $Na_2S$ and NaHS, but reacts readily with polysulfides to form thiosulfate:

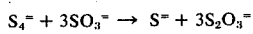
$$S_4^= + 3SO_3^= \rightarrow S^= + 3S_2O_3^=$$

Although the preferred treatment specifies the addition of sulfide in an amount stoichiometrically equivalent to the total chromate in the waste residue, our evaluation of residue-sulfide mixtures containing reductant levels less than stoichiometric (down to as low as ⅓ stoichiometric) has indicated unexpectedly effective suppression of chromate bleeding.

BRIEF DESCRIPTION OF THE DRAWINGS

FIGS. 1 and 2 diagrammatically present the results obtained in Example 1 to follow:

Referring now to FIG. 1, the curve relates to typical waste residue obtained from the processing of chrome ore to obtain sodium chromate, which residue had been efficiently leached with water during processing. The residue containing 13.2% moisture and 1.02% slowly (water) soluble hexavalent chromium compounds is treated with an aqueous dispersion of calcium sulfide according to a preferred method of the present invention, and stored outdoors in a conical pile. Example 1 details the method used, but essentially, the chart represents the chromium in the bleed expressed in parts per million (ppm) over a period of 16 weeks. It will be noted that by the end of the first week, the bleed contains less than 1 ppm Cr.

FIG. 2 represents the same test except that rather than parts per million, the bleed is rated according to color, based on the color produced by the soluble chromium in the bleed, with:

0 = colorless
1 = 5 ppm Cr.
2 = 10 ppm Cr.
3 = 25 ppm Cr.

It is clear that the color appears to indicate the presence of more Cr in the bleed than is actually present according to the chart of FIG. 1. The difference is due to that portion of the color contributed by polysulfides — which closely resembles that produced by soluble chromium salts.

Figure 3:
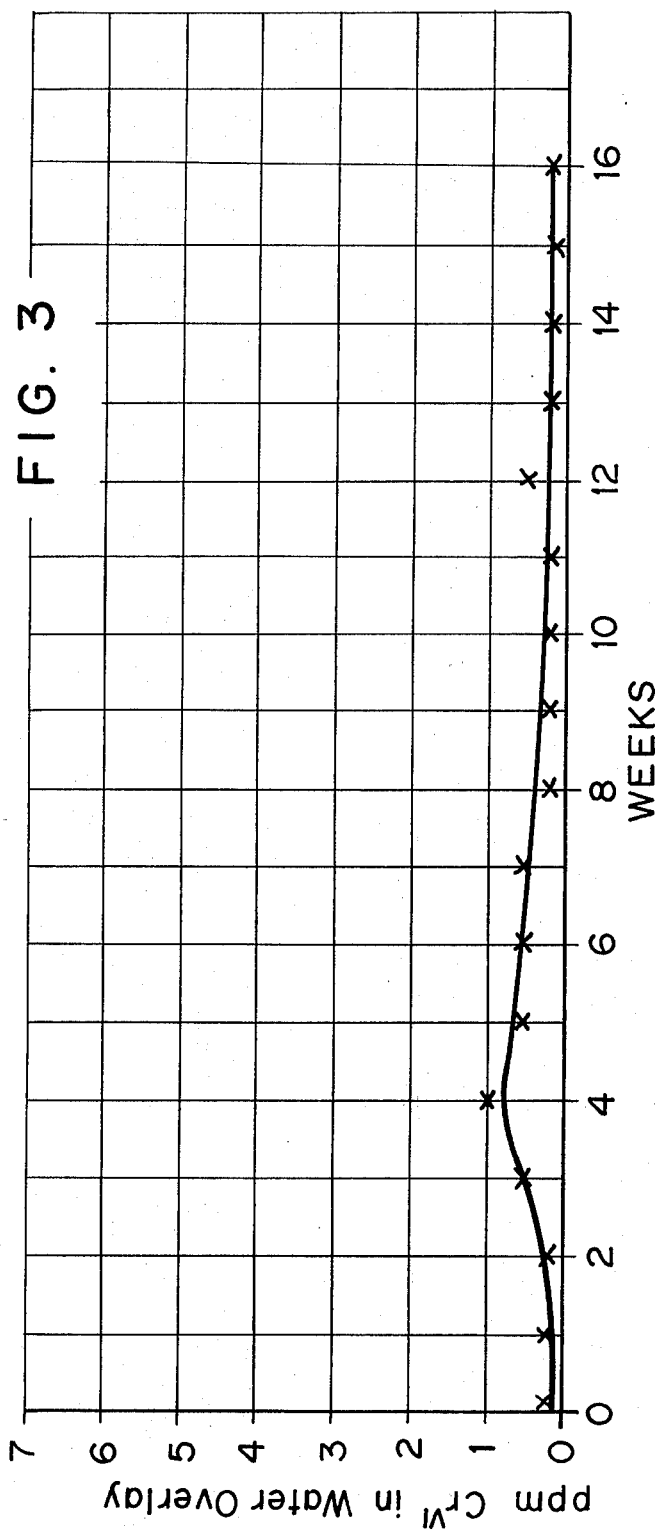
FIGS. 3 and 4 present the results obtained in Example 2.
Figure 4:
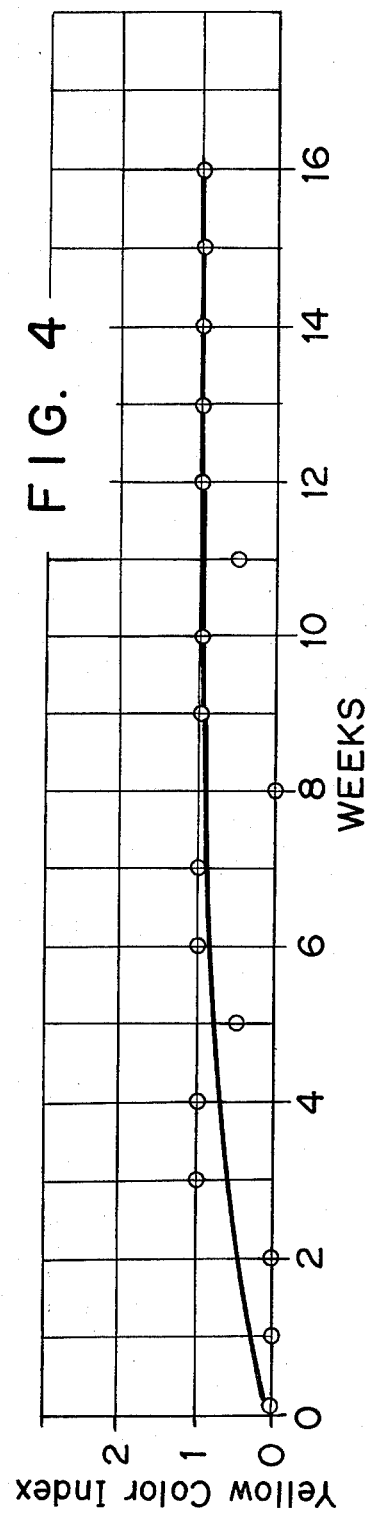

Referring to FIGS. 3 and 4, these two curves are similar to FIGS. 1 and 2, respectively, except that the residue contains 12.0% moisture, 1.17% slowly (water) soluble hexavalent chromium, and is treated with an aqueous solution of NaHS according to a preferred method of the present invention. Notice that in this case the color of the bleed, as plotted in FIG. 4 gradually increases to a point where it corresponds colorimetrically to 5 ppm Cr, whereas, actually the Cr is present at all times to the extent of less than 1 ppm (FIG. 3). The difference, as indicated in FIG. 4, is due to a gradual increase in the yellow color of the bleed due to polysulfide formation.

Figure 5:
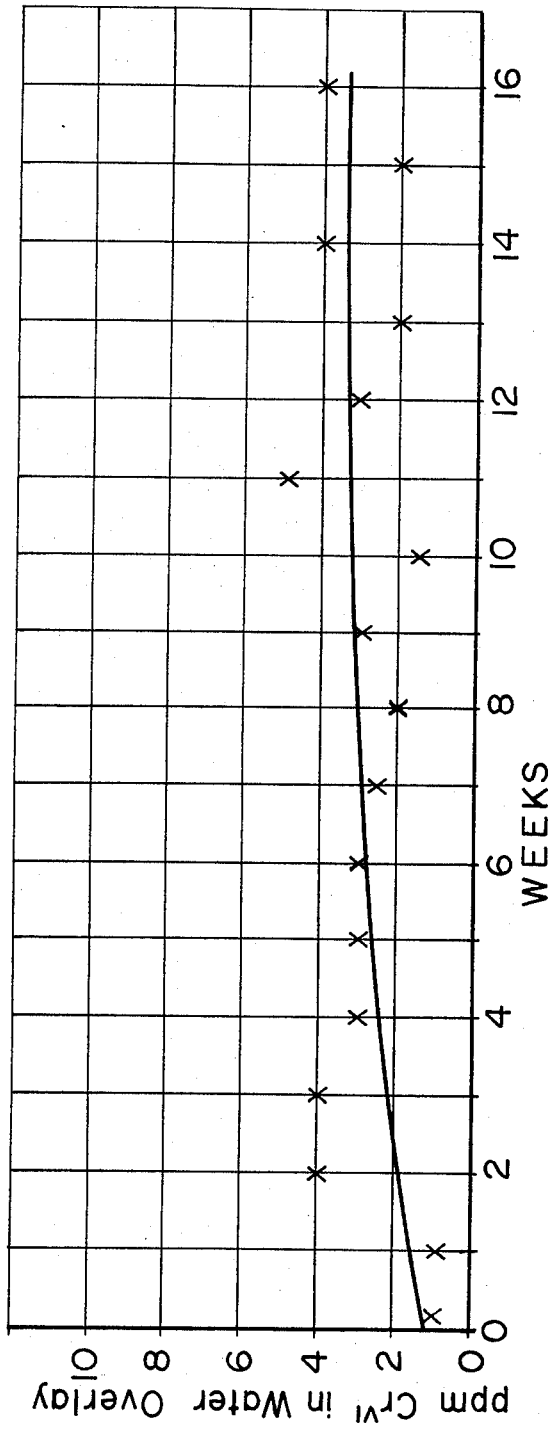
FIGS. 5 and 6 present the results obtained in Example 3.
Figure 6:
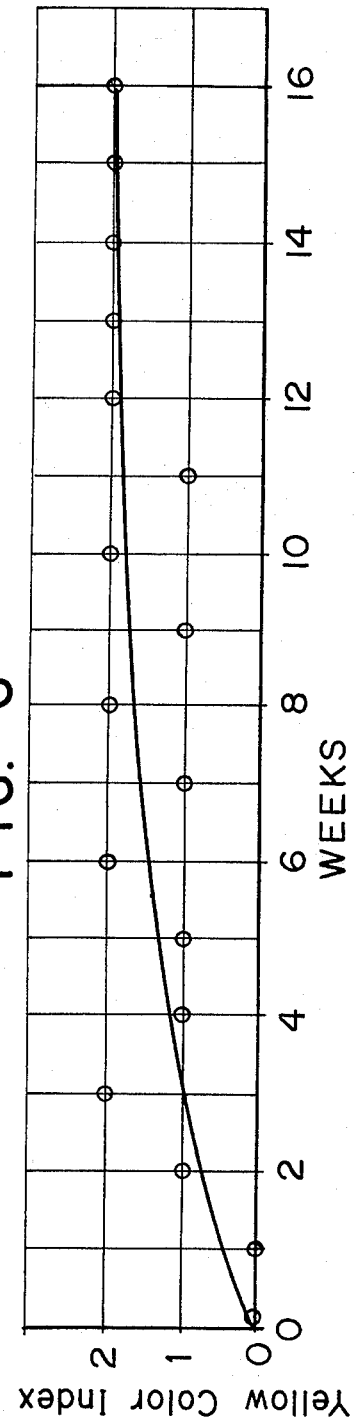

Referring to FIGS. 5 and 6, these two curves are similar to FIGS. 3 and 4 respectively. Residue having the same analysis as that used in Example 2 was used in Example 3, the results of which are presented in these graphs. In this example, however, the amount of NaHS solution used was only about one-third of the stoichiometric amount, based on the total chromate in the waste residue. Even with this sub-stoichiometric quantity, it will be noted that the color of the bleed, as plotted in FIG. 6, indicates a gradual increase to just under 10 ppm Cr, whereas actually, it increases gradually to only about 3 ppm Cr. The difference, as before, is related to the increase in the yellow color of the bleed due to polysulfide formation. The effectiveness of this small amount of reductant is surprising.

EXAMPLE 1

The following example illustrates the effectiveness of calcium sulfide treatment of chrome waste residue:

200 Pounds of chrome waste residue containing 13.2% moisture, 0.47% "free" alkalinity as $Na_2CO_3$, 0.07% "water-soluble" Cr(VI), and 1.02% total ("acid soluble") Cr(VI) was mixed lightly with 2 gallons of water and 4.7 pounds of powdered calcium sulfide (assay 90.4% CaS). It should be noted that the portion classified as "acid soluble" is also very slowly soluble in water, so that the total water soluble fraction present, can be considered as 0.07% + 0.95% or 1.02%.

The moist mix was stored outdoors in a polyethylene lined wooden trough, the mix being formed into a conical pile.

An untreated (control) pile was stored alongside the mix, consisting of 200 pounds of the waste residue from the same lot mixed lightly with 2 gallons of water.

After 4 hours, samples were withdrawn from the surface and interior of each pile and overlaid with water to determine the extent of chromate bleeding (10 grams of sample and 100 ml of water). The supernatant effluent in the overlay sample was analyzed after an additional 4 hours for chromate concentration (diphenyl carbazide colorimetric method) and effluent color (visual matching with color standards).

Samples were then similarly withdrawn from the control and residue-reductant mix piles, on a weekly basis, and evaluated by overlaying with water as described above. During this period there was a normal pattern of fair and rainy weather. The data are represented in FIG. 1.

The untreated (control) residue showed chromate bleeding at a uniform level in excess of 100 ppm Cr(VI) throughout, whereas the CaS-treated material (after the first week) bled only traces of chromate (of the order of 1 ppm Cr(VI) or less). Furthermore, little or no polysulfide could be detected in the water overlays. That is, the slight yellow color of the effluents could essentially be accounted for entirely on the basis of their trace chromate content.

EXAMPLE 2

The following example illustrates the effectiveness of sodium hydrosulfide treatment of chrome waste residue:

200 Pounds of chrome waste residue containing 12.0% moisture, 0.42% "free" alkalinity as $Na_2CO_3$, 0.09% "water-soluble" Cr(VI) and 1.08% "acid soluble" (or a total of 1.17% acid soluble on analysis) Cr(VI) was mixed lightly with 2 gallons of water and 9.45 pounds of an aqueous solution containing 40.0% by weight NaHS. It should be noted that the portion classified as "acid soluble" is also slowly soluble in water, so that the total water soluble fraction present, can be considered as 0.09% + 1.08% or 1.17%.

The moist mix was stored outdoors in a polyethylene lined wooden trough, the mix being formed into a conical pile.

An untreated (control) pile was stored alongside the mix, consisting of 200 pounds of the waste residue from the same lot mixed lightly with 2.7 gallons of water.

Samples were withdrawn from the surface and interior of the piles at weekly intervals and evaluated as described in Example 1 above.

The data are represented in FIG. 2.

The untreated residue showed chromate bleeding at a uniform level in excess of 100 ppm Cr(VI) throughout, whereas the NaHS treated material bled only traces of chromates (of the order of 1 ppm Cr(VI) or less). The difference between the yellow color attributable to chromate and the observed total color of the effluent was small in the first four week period with some tendency to increase slightly after that, indicating that traces of polysulfide could be present (but less than that corresponding colorwise to 5 ppm chromate throughout).

EXAMPLE 3

The following example illustrates the effectiveness of sub-stoichiometric levels of sodium hydrosulfide:

200 Pounds of chrome waste residue from the same lot described in Example 2 was mixed lightly with 2 gallons of water and 2.91 pounds of an aqueous solution containing 40.0% by weight NaHS. This quantity of NaHS corresponds to that stoichiometrically equivalent to all of the water-soluble Cr(VI) in the residue (0.18 lbs.) plus 25% of the remaining (acid soluble) Cr(VI) in the residue (0.54 lbs.) or approximately ⅓ of that used in Example 2.

The moist mix was stored outdoors and evaluated in the same manner as the mixes described in Examples 1 and 2.

The untreated (control) residue showed chromate bleeding in excess of 100 ppm Cr(VI) throughout, whereas the NaHS treated residue bled <10 ppm all of the time and <4 ppm part of the time in the 16 week period during which the mix was evaluated. The data are represented in FIGS. 5 and 6.

Since certain changes may be made in carrying out the above methods without departing from the scope of the invention, it is intended that all matter contained in the above description shall be interpreted as illustrative and not in a limiting sense.

We claim:

1. A method fpr continuously insolubilizing essentially all water-solubilized hexavalent chromium compounds leached from a chrome ore residue obtained by production of chromium chemicals for chromite ore by roasting the ore under alkaline oxidizing conditions to form water-soluble hexavalent chromium compounds, which comprises adding to said residue a sulfur-containing reductant, thereby continuously effecting reduction of said water-solubilized hexavalent chromium compounds in the presence of an aqueous medium under conditions sufficient to reduce said water-solubilized hexavalent chromium compounds to their insoluble form.

2. The method of claim 1 wherein at least part of the aqueous medium is separated from the residue and recycled for use in the reduction of water-solubilized hexavalent chromium compounds in said chrome ore residue.

3. The method of claim 1 wherein the reduction is an organic sulfur-containing compound, selected from the group consisting of thiourea, thioglycolic acid, sodium xanthate, thioacetamide and bis(dimethylthiocarbamoyl)disulfide.

4. The method of claim 1 wherein the reductant is calcium sulfide.

5. The method of claim 1 wherein the reductant is sodium hydrosulfide.

6. The method of claim 1 in which the reductant is produced by reaction of a calcium compound contained in said or residue with an added sulfide.

7. The method of claim 1 wherein the reductant is selected from the group consisting of alkali metal and alkaline earth metal sulfides, and the sulfide ions are present in an amount of at least equivalent to about one-third of the amount of sulfide ions stoichiometrically required to reduce the total water-soluble hexavalent chromium compounds in the chrome ore residue to the trivalent state.

8. The method of claim 1 wherein the reductant is selected from the group consisting of alkali metal and alkaline earth metal hydrosulfides and wherein polysulfide formation is suppressed by the addition of a minor amount of sodium sulfite to the chrome ore residue.

9. The process of claim 4 wherein the amount of calcium sulfide added is equivalent to from about 1 to 3 moles of calcium sulfide per 2 moles of hexavalent chromium, calculated as $CrO_4$, in said chrome ore residue.

10. The process of claim 5 wherein the amount of sodium hydrosulfide added is equivalent to from about 1 to 3 moles of sodium hydrosulfide per 2 moles of hexavalent chromium, calculated as $CrO_4$, in said chrome ore residue.

11. The method of claim 1 wherein the sulfur-containing reductant is selected from the group consisting of alkali metal and alkaline earth metal hydrosulfides and mixtures thereof.

12. The method of claim 1 wherein the sulfur-containing reductant is selected from the group consisting of alkali metal and alkaline earth metal sulfides.

13. The method of claim 1 wherein the sulfur-containing reductant is selected from the group consisting of alkali metal and alkaline earth metal dithionites.

14. The method of claim 1 wherein the chrome ore residue contains water-soluble hexavalent chromium compounds in an amount of from about 0.5 to 5 percent chromium, based on the weight of the chrome ore residue.

* * * * *